United States Patent
Durrant et al.

(10) Patent No.: US 11,594,802 B2
(45) Date of Patent: Feb. 28, 2023

(54) APPARATUSES FOR REDUCING AIR CONDENSATION IN COMPONENTS OF SATCOM ANTENNA SUBSYSTEM

(71) Applicant: Thales Avionics, Inc., Irvine, CA (US)

(72) Inventors: Peter T. G. Durrant, Guildford (GB); Philippe Favard, Maisons-Laffitte (FR); Mehdi Gherib, Cergy (FR); Achille Combrisson, Asnières-sur-Seine (FR)

(73) Assignee: Thales Avionics, Inc., Irvine, CA (US)

( * ) Notice: Subject to any disclaimer, the term of this patent is extended or adjusted under 35 U.S.C. 154(b) by 233 days.

(21) Appl. No.: 16/983,358

(22) Filed: Aug. 3, 2020

(65) Prior Publication Data
US 2021/0050645 A1   Feb. 18, 2021

Related U.S. Application Data

(60) Provisional application No. 62/888,245, filed on Aug. 16, 2019.

(51) Int. Cl.
*H01Q 1/02* (2006.01)
*H01Q 1/42* (2006.01)

(52) U.S. Cl.
CPC ............ *H01Q 1/02* (2013.01); *H01Q 1/42* (2013.01)

(58) Field of Classification Search
CPC ............ H01Q 1/02; H01Q 1/42; H01Q 1/288
See application file for complete search history.

(56) References Cited

U.S. PATENT DOCUMENTS

| | | | |
|---|---|---|---|
| 5,392,056 A | * | 2/1995 | DeTeso ............... H01Q 1/40 343/873 |
| 6,502,328 B1 | * | 1/2003 | Love ................... F26B 3/343 95/122 |
| 8,988,294 B2 | | 3/2015 | Voss et al. |
| 2003/0029185 A1 | * | 2/2003 | Kopko ............... F24F 1/0087 62/271 |

(Continued)

FOREIGN PATENT DOCUMENTS

| CN | 207221645 U | 4/2018 |
|---|---|---|
| JP | 61133703 A | 6/1986 |

OTHER PUBLICATIONS

Extended European Search Report dated Jan. 22, 2021 for European Patent Application No. 20191065.0, 12 pages.

*Primary Examiner* — Lam T Mai
(74) *Attorney, Agent, or Firm* — Sage Patent Group

(57) ABSTRACT

Some embodiments of the present disclosure are directed to an antenna system for an airplane. The antenna system including an antenna system enclosure and a desiccant enclosure within the antenna system enclosure and having desiccant material positioned between an outside air pipe and an inside air pipe, the inside air pipe extending from the desiccant enclosure to open to an interior air volume of at least one component of the antenna system within the antenna system enclosure, the outside air pipe extending from the desiccant enclosure to ambient air outside the antenna system enclosure, and the desiccant material is configured to absorb moisture in the ambient air flowing from the outside air pipe to the inside air pipe through the desiccant enclosure while air pressure is being equalized from outside to inside the antenna system enclosure.

23 Claims, 15 Drawing Sheets

(56) References Cited

U.S. PATENT DOCUMENTS

| | | | |
|---|---|---|---|
| 2004/0031282 A1* | 2/2004 | Kopko | F24S 10/60 |
| | | | 62/271 |
| 2011/0061539 A1 | 3/2011 | Lam et al. | |
| 2013/0141186 A1* | 6/2013 | Nguyen | H01P 1/00 |
| | | | 333/137 |
| 2013/0141288 A1* | 6/2013 | Voss | H01Q 1/02 |
| | | | 343/705 |
| 2013/0141300 A1* | 6/2013 | Runyon | H01P 5/12 |
| | | | 333/137 |
| 2013/0154764 A1* | 6/2013 | Runyon | H01P 11/001 |
| | | | 333/135 |
| 2016/0190674 A1 | 6/2016 | Voss et al. | |
| 2016/0269099 A1* | 9/2016 | Auricchio, Jr. | H04B 7/18515 |
| 2019/0157741 A1* | 5/2019 | Runyon | H01P 5/12 |
| 2020/0231290 A1* | 7/2020 | Dickson | B64D 13/08 |

* cited by examiner

APPARATUSES FOR REDUCING AIR CONDENSATION IN COMPONENTS OF SATCOM ANTENNA SUBSYSTEM

CROSS REFERENCE TO RELATED APPLICATION

This application claims priority to U.S. Prov. App. No. 62/888,245 filed Aug. 16, 2019, the disclosure and content of which is incorporated by reference herein in its entirety.

FIELD OF THE INVENTION

The present disclosure relates to communication systems for use on aircraft and, more particularly, to condensation control systems in airborne radio frequency (RF) antenna devices.

BACKGROUND

Airborne RF antenna devices typically have internal air volumes. For example, air cavities typically exists within the interior volumes of the antenna aperture, waveguides, and other elements. It is generally not possible to environmentally seal the interior air volumes of airborne RF antenna devices because of the substantial ambient air pressure changes occurring between ground and cruise altitudes that are repeated during the lifespan of an aircraft. Attempts to seal the interior air volume would usually result in bursting of the seals or other surfaces thereby allowing moisture to enter in an uncontrolled manner. Therefore, typically an array type airborne RF antenna device is vented to the ambient air.

Such venting facilitates pressure equalization between the internal air volumes and ambient air. However, the cycling of air pressure over repeated flights functions to pump moisture into the internal air volumes where it accumulates to the detriment of components of the RF antenna device. For example, water corrodes metal components of the RF antenna. Water can also substantially degrade performance of high frequency antenna components. For example, performance of RF waveguides can be severely degraded if water is located at certain locations on the RF waveguides and antenna aperture components, such as on the power dividers where RF current densities can be the highest. This can be particularly true in Ku and, in particular, Ka band frequency RF antenna devices.

Therefore, there exists a need to prevent condensation and/or reduce moisture in the air in the internal air volumes of RF antenna devices of this type.

SUMMARY

Some embodiments of the present disclosure are directed to an antenna system for an airplane. The antenna system including an antenna system enclosure. The antenna system also includes a desiccant enclosure within the antenna system enclosure and having desiccant material positioned between an outside air pipe and an inside air pipe, the inside air pipe extending from the desiccant enclosure to open to an interior air volume of at least one component of the antenna system within the antenna system enclosure, the outside air pipe extending from the desiccant enclosure to ambient air outside the antenna system enclosure, and the desiccant material is configured to absorb moisture in the ambient air flowing from the outside air pipe to the inside air pipe through the desiccant enclosure while air pressure is being equalized from outside to inside the antenna system enclosure.

Potential advantages of these embodiments include removing moisture from air flowing into interior air volume of at least one component of the antenna system within the antenna system enclosure, such as an RF antenna device or an RF waveguide.

It is noted that aspects described with respect to one embodiment may be incorporated in different embodiments although not specifically described relative thereto. That is, all embodiments and/or features of any embodiments can be combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
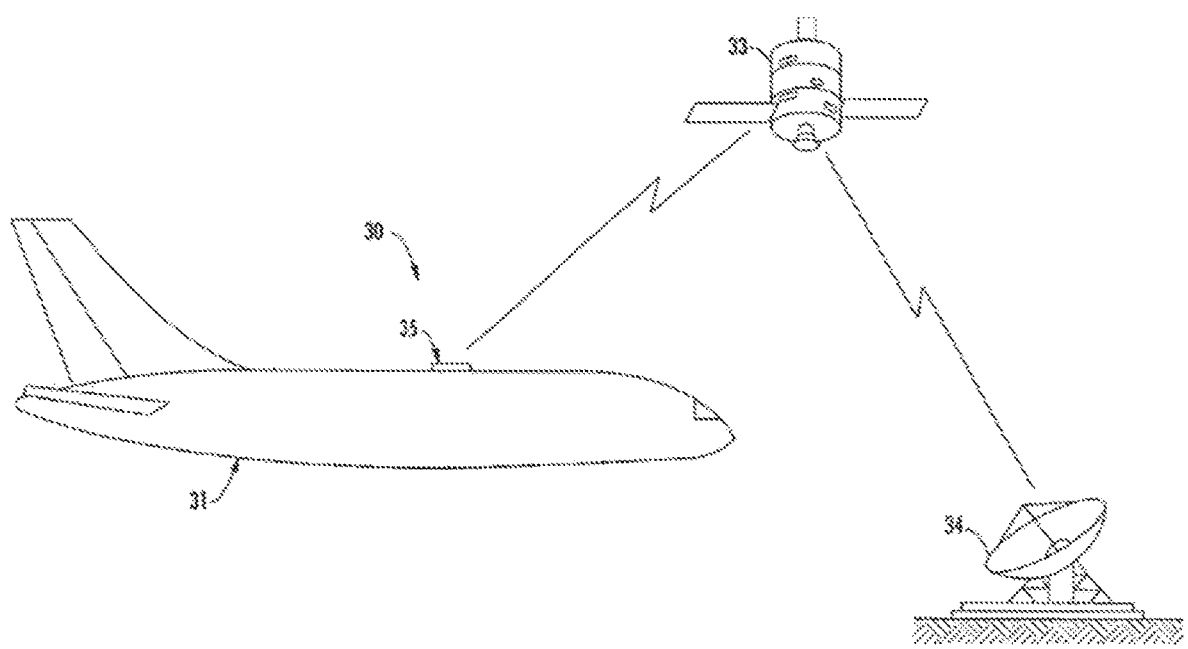
FIG. 1 is a schematic diagram of some components of an aircraft with an antenna system that communicatively interconnects an in-flight entertainment system and other aircraft systems to a satellite communications system.

FIG. 1 is a schematic diagram of some components of an aircraft 31 with an antenna system that communicatively interconnects an in-flight entertainment system and other aircraft systems to a satellite communications system. An aircraft system 30 provides data communication services, such as bidirectional Internet connectivity and may receive television and/or audio broadcast data and transmit, and may communicate other data (e.g., flight data, diagnostic data, and other data) via one or more satellites 33. The satellite 33 relays data communicated between the aircraft system 30 and a terrestrial station 34 as will be appreciated by those skilled in the art. The data can be distributed within the aircraft 31 by wired and/or wireless networks to passenger equipment and/or aircraft components.

As explained above, a radome and/or other housing enclosing components of the antenna system need to be vented to allow equalization of air pressure as the aircraft repetitively climbs and descends between ground and cruising altitudes. The housing is also referred to as an "enclosure" and "antenna enclosure." Embodiments of the present disclosure are directed to innovative condensation control components that operate to reduce moisture in ambient air that is supplied during inward air pressure equalization to various components of the antenna system within an enclosure (e.g., radome).

Figure 2:
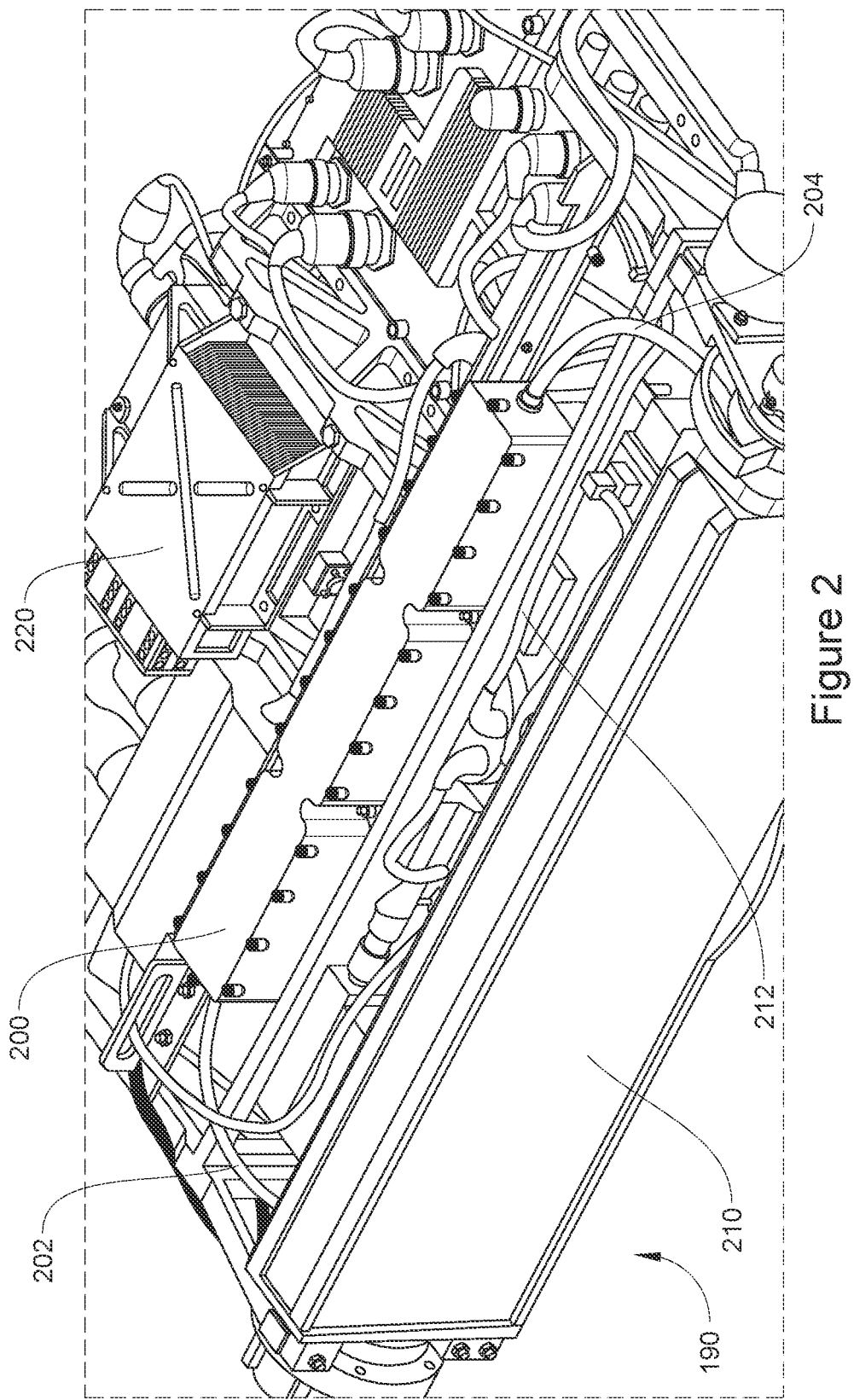
FIG. 2 is an isometric view of antenna system components which include a condensation control component for reducing moisture in ambient air vented to various other components and which are configured in accordance with some embodiments of the present disclosure.

FIG. 2 is an isometric view of components of an antenna system 190 which are configured in accordance with some embodiments of the present disclosure and which may form part of the antenna system 35 in FIG. 1. Referring to FIG. 2, the components include a RF antenna aperture 210 that transmits and receives RF signals for communications with the satellites 33. A RF power amplifier 220 is connected to the RF antenna aperture 210 through cabling 212 and configured to supply RF signaling for transmission.

In accordance with various embodiments, antenna system 190 further includes a desiccant box 200 containing a desiccant material configured to absorb water present in air passing there through. The desiccant box 200 is vented to ambient air outside the antenna system enclosure, e.g., the radome, via an input air pipe, such as air pipe 204. When the ambient air pressure is greater than the air pressure in the antenna internal air volumes vented through the desiccant box 200, air flows from outside the antenna system enclosure through the input air pipe to the desiccant box 200, and flows through the desiccant material therein which reduces moisture in the air that is output through an output air pipe 202 to one or more other components of the antenna system 190.

Various embodiments are described in the context of a rectangular shaped desiccant box. However, these and other embodiments are not limited to any particular shape of a desiccant box. For example, a desiccant box may be a cylindrical tube containing desiccant material. Accordingly, the term desiccant box is also referred to as a desiccant enclosure to reflect the wide variety of shapes that may be used to constrain air movement through a desiccant material.

Figure 3:
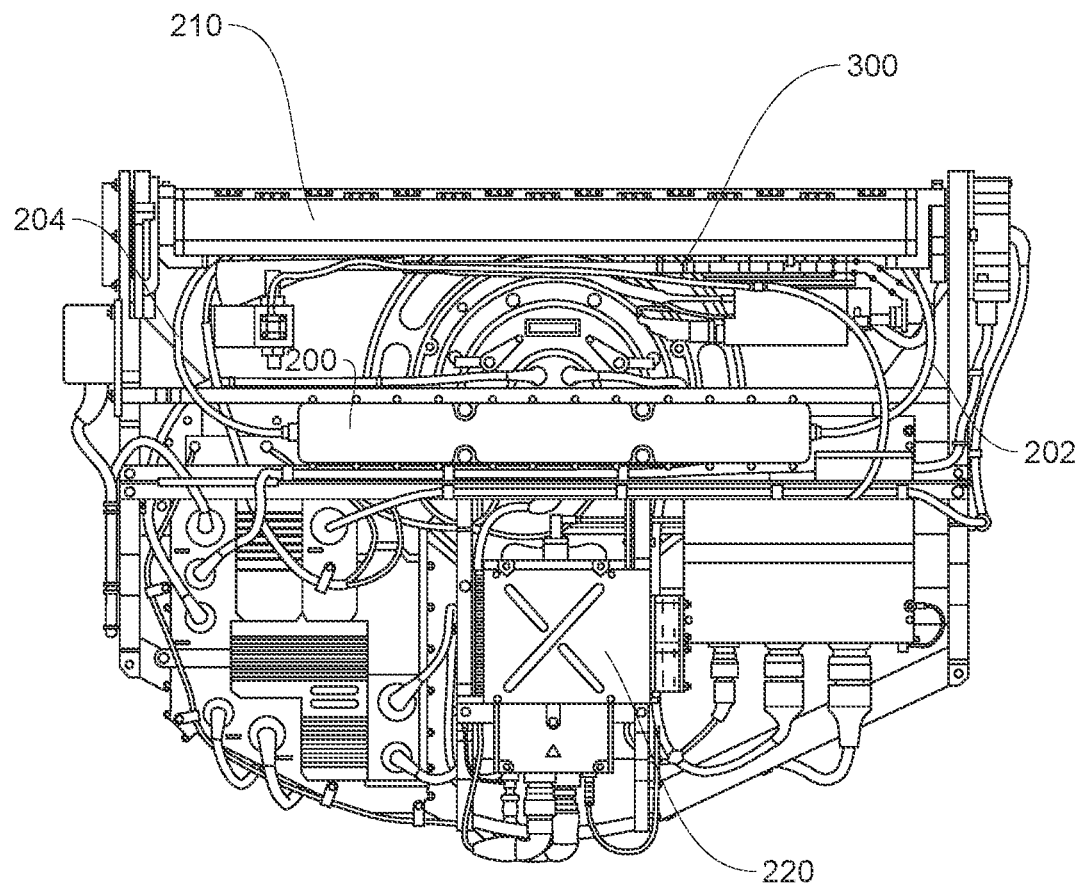
FIG. 3 is a top view of the antenna system components shown in FIG. 2.
Figure 4:
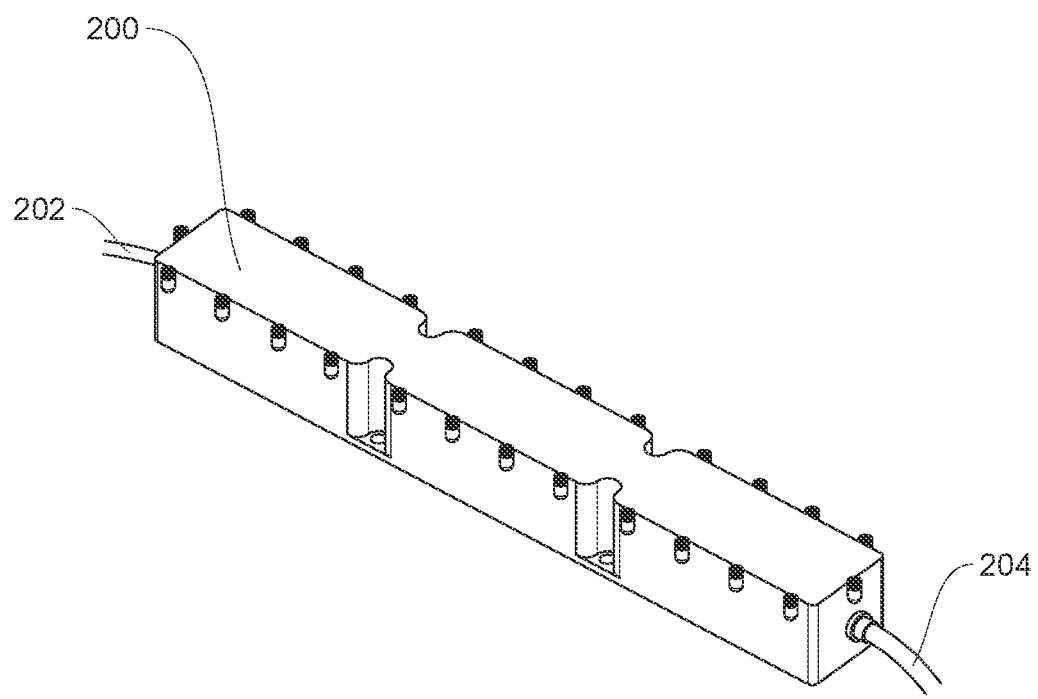
FIG. 4 is an isometric view the condensation control component of FIG. 2 which is configured in accordance with some embodiments of the present disclosure.

FIG. 3 is a top view of the antenna system components shown in FIG. 2. FIG. 4 is an isometric view of the desiccant box 200 type of condensation control component of FIG. 2 which is configured in accordance with some embodiments of the present disclosure. Referring to FIGS. 2, 3, and 4, the output air pipe 202 from the desiccant box 200 can be connected to supply reduced-moisture air to internal air volumes of the RF antenna aperture 210 and/or to a RF waveguide 300 that interconnects the RF antenna aperture 210 and the various RF signal cabling 212. The RF waveguide 300 can include a network of waveguides carrying transmit and receive RF signals, and be interconnected with further waveguides inside the aperture body, as will be appreciated by those skilled in the art. The RF antenna aperture 210 may be directionally steered by a positioner mechanism as will be appreciated by those skilled in the art.

The RF antenna aperture 210 and the RF waveguide 300 include internal air volumes. The desiccant box 200 is connected through one or more air pipes to supply reduced-moisture air to those air volumes in order to allow pressure equalization venting to the environment outside the antenna system through the desiccant box 200 while reducing or avoiding accumulation of moisture in the internal air volumes of the RF antenna aperture 210 and the RF waveguide 300.

The internal air volumes of the RF antenna aperture 210 may be defined as the cavity that is bounded on one end by an aperture close out and formed within the interstitial spaces formed by aperture grid plates, and within the interior cavities of the various feed horns, and/or can be defined by interior cavities of the various waveguides of the waveguide combiners connected to the feedhorns of aperture horn plate.

Figure 11:
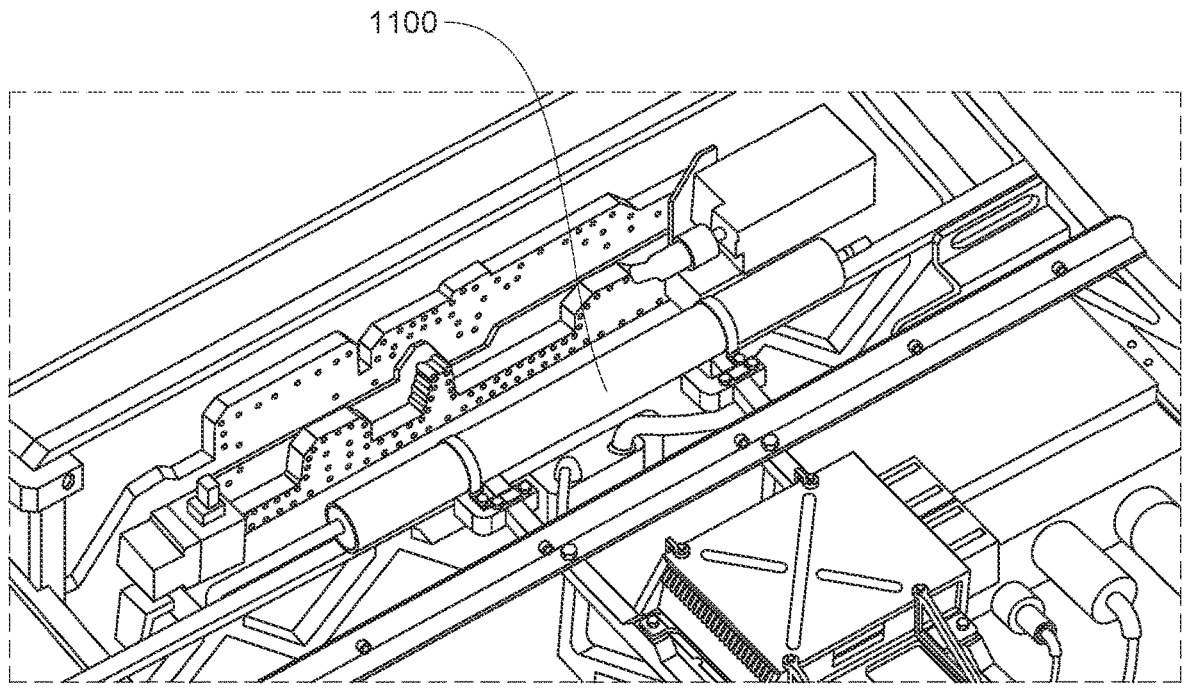
FIGS. 11 and 12 show an illustration of a desiccant enclosure shaped as a cylindrical tube.
Figure 12:
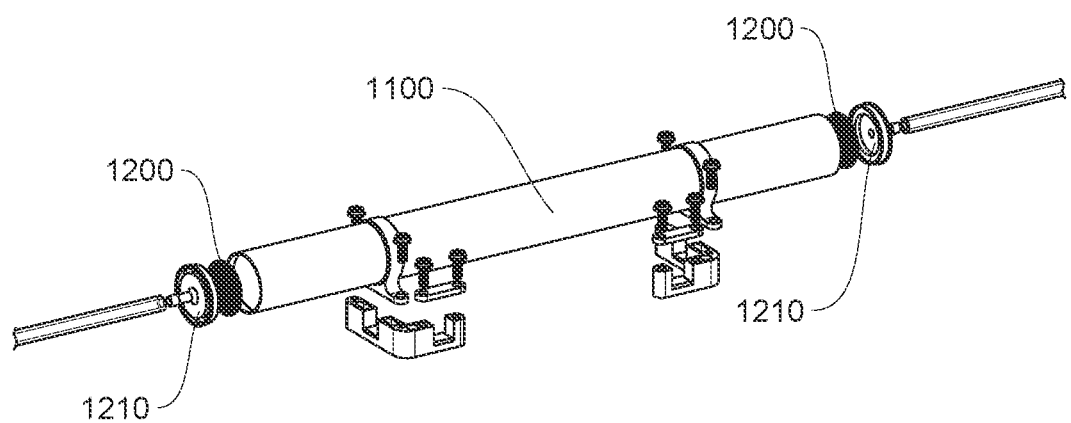

FIGS. 11 and 12 show an illustration of a desiccant enclosure 1100 shaped as a cylindrical tube. In FIG. 12, the cylindrical desiccant enclosure 1100 is mounted to a frame supporting the RF antenna aperture 210 and the RF waveguide 300. In some other embodiments, the cylindrical desiccant enclosure 1100 can be mounted against, and thermally coupled to, the RF power amplifier 220 to cause the desiccant material to be regenerated by heating from the RF power amplifier 220 during its operation to supply RF signaling to the antenna for transmission. The cylindrical desiccant enclosure 1100 may alternatively or additionally be heated by a heater element, which may be positioned within the enclosure 1100 and extend axially to heat the desiccant material along a length of the cylindrical desiccant enclosure 1100. In one embodiment, the heater element extends in a spiral pattern along an interior surface of the cylindrical desiccant enclosure 1100 to more uniformly heat the desiccant material along a length of the cylindrical desiccant enclosure 1100. A power supply supplies current to the heater element to generate heat. A controller 620 may control timing of heating by the heater element such as described in further detail below. In one embodiment, the heating element includes a resistive strip heater or other electrically active heater.

Referring to FIG. 12, fine mesh 1200 is placed at both ends of the desiccant enclosure 1100 to block the desiccant material inside the desiccant enclosure 1100 from traveling into the tubes at either end of the desiccant enclosure 1100. The fine mesh 1200 can be placed in endcaps 1210 of the desiccant enclosure 1100. In one embodiment, the mesh 1200 has openings allowing airflow therethrough and which openings have smaller cross-sectional openings than a smallest cross-sectional width of granular particles of the desiccant material. Configuring the mesh 1200 to have openings sized in this manner can prevent or at least substantially inhibit escape of desiccant material into the tubes which could otherwise result in constriction or blockage of any airflow therethrough. In some embodiments, the size of the gaps in the fine mesh 1200 is 10 µm.

The desiccant material within the desiccant box 200 can be any suitable material that reduces moisture in the air passing through the desiccant box 200 under the circumstances contemplated herein. For example, the material is selected to be capable of drying air flowing from outside the antenna system enclosure to within the internal air volume while subjected to cycling airflows between (1) relatively higher altitude, drier air and (2) relatively lower altitude, moister air. The desiccant material can be selected to optimize air drying for the intended environmental conditions. Examples of desiccant material can include, but are not limited to, any one or more of: aluminum dioxide, molecular sieve, silica gel, montmorillonite clay, calcium sulfate, and calcium chloride. Because airplanes operate in cold environments, the material chosen for every part of the antenna system must be one that will remain flexible at low temperatures and can survive repeated hot to cold and humidity cycles on each flight.

In some embodiments, the desiccant material can be made of molecular sieves. Molecular sieves can include a granular material with pores, i.e., very small holes which may be of uniform size.

In some embodiments, the mass of the complete desiccant enclosure and the desiccant material has a maximum weight of 400 g.

Implementation of various embodiments discussed herein would be subject to forces such as vibration, acceleration, pitching, and rolling common to vehicle environments such as an airplane environment. The forces can cause desiccant material placed in a desiccant enclosure to settle in a way that creates voids between the desiccant material and the desiccant enclosure and allowing airflow to bypass the desiccant material, which results in the bypassed desiccant material becoming ineffective for drying the airflow.

Figure 14:
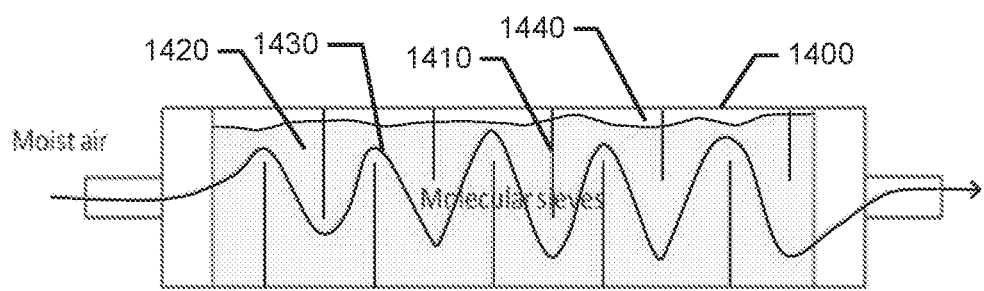
FIG. 14 illustrates a desiccant enclosure with a structure provided within the desiccant enclosure in accordance with some embodiments of the present disclosure.

FIG. 14 illustrates a desiccant enclosure 1400 with a structure 1410 provided within the desiccant enclosure in accordance with some embodiments of the present disclosure. Some embodiments are directed to structure 1410 provided within the desiccant enclosure 1400 which directs the airflow 1430 in a pathway through the desiccant material 1420 in manners that avoid the airflow 1430 bypassing the desiccant material 1420 even when settling of the desiccant material 1420 occurs along regions of the desiccant enclosure 1400. Vibrations during flight operation can abrade the desiccant material 1420, causing the desiccant material 1420 breakdown rendering the desiccant less effective and settle (compact) resulting in creation of an air bypass 1440 on the top of the desiccant enclosure 1400 which can allow the airflow to partially bypass the desiccant. The structure 1410 provided within the desiccant enclosure 1400 can slow the abrasion and prevent or inhibit settling of the desiccant material 1420. The structure 1410 provided in the desiccant enclosure 1400 also elongates the airflow pathway 1430, increasing the effectiveness of the desiccant material 1420.

Figure 15:
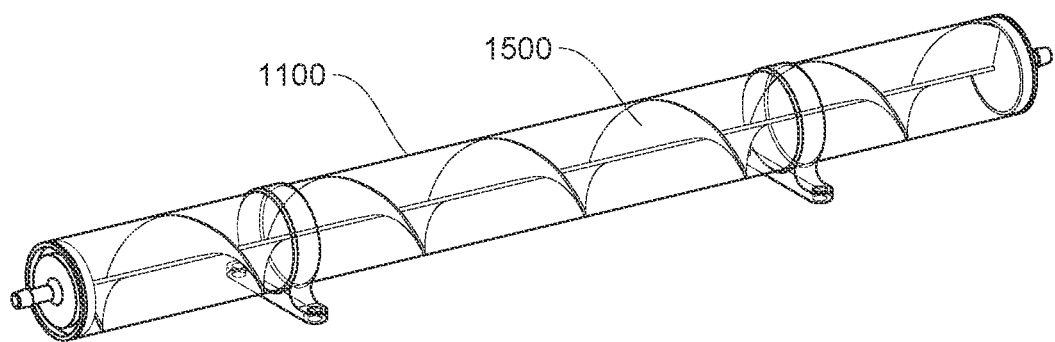
FIG. 15 illustrates a desiccant enclosure, here illustrated as a cylindrical tube, with a spiral structure provided in the desiccant enclosure in accordance with some embodiments of the present disclosure.

FIG. 15 illustrates a desiccant enclosure 1100, here illustrated as a cylindrical tube, with a spiral structure 1500 provided in the desiccant enclosure 1100 in accordance with some embodiments of the present disclosure. In one embodiment, a spiral structure 1500 is provided in the desiccant enclosure 1100 extending along at least portions of a major axis of the desiccant enclosure 1100 along the air flow pathway between the input tube and the output tube. In a further embodiment, the desiccant enclosure 1100 is a cylinder with an interior diameter and the spiral structure 1500 has a diameter that is about equal to the interior diameter of the cylinder. The diameter of the spiral structure 1500 can be smaller than the interior diameter of the cylinder 1100. It may be advantageous for a difference between the diameter of the spiral structure 1500 and the interior diameter of the cylinder 1100 to be less than a particle size of the desiccant material to inhibit settling of the desiccant material in a direction along the length of the cylinder 1100. However, the difference may be greater and defined based on inhibiting airflow through an anticipated size of voids that can form over time along an upper portion of the cylinder 1100 from downward settling, e.g., compaction, of the desiccant material due to gravity and environmental vibration and/or pitch and/or roll while being transported on the aircraft.

In some embodiments, the cylinder 1100 has a volume not greater than about 300 cm$^3$ and contains not more than about 400 g of desiccant. In one embodiment, the cylinder 1100 has a volume of about 260 cm$^3$, an internal diameter of about 31 mm, and contains about 195 g of desiccant.

In one embodiment, the diameter of the spiral structure is about 90% of the diameter of the cylinder. In another embodiment, the diameter of the spiral structure is about 80% of the diameter of the cylinder. In another embodiment, the diameter of the spiral structure is about 70% of the diameter of the cylinder. In another embodiment, the diameter of the spiral structure is about 60% of the diameter of the cylinder. In another embodiment, the diameter of the spiral structure is about 50% of the diameter of the cylinder. Depending upon the particle size of the desiccant material and the firmness with which the desiccant material is packed into the cylinder, providing the spiral structure with at least 90% percent of the diameter of the cylinder may be sufficient to prevent and unacceptable amount of airflow bypass of the desiccant material along a length of the cylinder.

Although some embodiments are described in the context of a spiral structure being used in combination with the cylindrically shaped desiccant enclosure, a spiral structure may be used with a rectangular shaped or other shaped desiccant enclosure. For example, a ramp shaped meandering pathway may be provided by flat surfaces that extend at angles alternating upward and downward toward the top and bottom surfaces, respectively, of a rectangular shaped enclosure to force airflow to meander upward near a top surface of the enclosure and then dive downward near a bottom surface of the ensure, to ensure that the airflow passes through a sufficient amount of the desiccant material enclosed in the enclosure while flowing from an air input port to an air output port of the enclosure.

In some further embodiments, the spiral structure extends longitudinally along the interior surfaces between the input and output airflow ports of the cylinder or other enclosure. The spiral structure may extend at least substantially between endcaps of the desiccant enclosure. The spiral structure may extend to contact and be structurally fixated between endcaps of the desiccant enclosure. In one embodiment, the spiral structure extends longitudinally along the interior surfaces of the ends of the desiccant enclosure for a length of 75% of the desiccant enclosure. In other further embodiments, the spiral structure extends longitudinally along the interior surfaces of the ends of the desiccant enclosure for a length of 50% of the desiccant enclosure. In other further embodiments, the spiral structure extends longitudinally along the interior surfaces of the ends of the desiccant enclosure for a length of 25% of the desiccant enclosure.

In some embodiments, the desiccant enclosure has a rectangular shape with a top surface relative to gravity when mounted and operating, a bottom surface opposite of the top surface, and two side surfaces. The rectangular desiccant enclosure has a structure within it including airflow guides. In some embodiments, the airflow guides have a depth and a width extending from the top surface of the desiccant enclosure. The shapes of the airflow guides direct the airflow through the desiccant material in manners that avoid the airflow bypassing the desiccant material even when voids form between the desiccant material and the top surface along regions of the desiccant enclosure due to settling of the desiccant material. A plurality of the airflow guides can be spaced apart in the desiccant enclosure along the air flow pathway between the input tube and the output tube. Each of the airflow guides force the airflow to be diverted downward away from the top surface of the enclosure through the desiccant material toward the bottom surface of the enclosure, and then after passing the airflow guide the airflow widely fans outward through the desiccant material between the top and bottom surfaces.

The number of airflow guides spaced apart within the desiccant enclosure, the depths of the airflow guides extending from the top surface, and/or the width of the airflow guides across the desiccant enclosure may be defined to provide at least a threshold airflow rate through the desiccant material and ensure that no more than a threshold length of possible bypass void along a top surface the desiccant material can be traveled by the airflow from the input to output tubes of the desiccant enclosure.

In one embodiment, the airflow guides extend from the top surface of the enclosure downward to a depth of at least one half of the distance between the top and bottom surfaces of the desiccant enclosure. In another embodiment, the airflow guides extend from the top surface downward to a depth of at least 25% of the distance between the top and bottom surfaces of the desiccant enclosure. In another embodiment, the airflow guides extend from the top surface downward to a depth of at least 75% of the distance between the top and bottom surfaces of the desiccant enclosure. Different airflow guides may have different depths.

In one embodiment, the airflow guides extend between the two side surfaces of the desiccant enclosure. In another embodiment, the airflow guides have a width across the desiccant enclosure of at least 90% of the distance between the two side surfaces of the desiccant enclosure. In another embodiment, the airflow guides have a width across the desiccant enclosure of at least 75% of the distance between the two side surfaces of the desiccant enclosure. In another embodiment, the airflow guides have a width across the desiccant enclosure of at least 50% of the distance between the two side surfaces of the desiccant enclosure.

In further embodiments, the airflow guides extend laterally between the interior surfaces of the input and output ends of the desiccant enclosure to a length of the whole desiccant enclosure. In other further embodiments, the airflow guides extend laterally between the interior surfaces of the input and output ends of the desiccant enclosure to a length of 75% of the desiccant enclosure. In other further embodiments, the airflow guides extend laterally between the interior surfaces of the input and output ends of the desiccant enclosure to a length of 50% of the desiccant enclosure. In other further embodiments, the airflow guides extend laterally between the interior surfaces of the input and output ends of the desiccant enclosure to a length of 25% of the desiccant enclosure.

Figure 5:
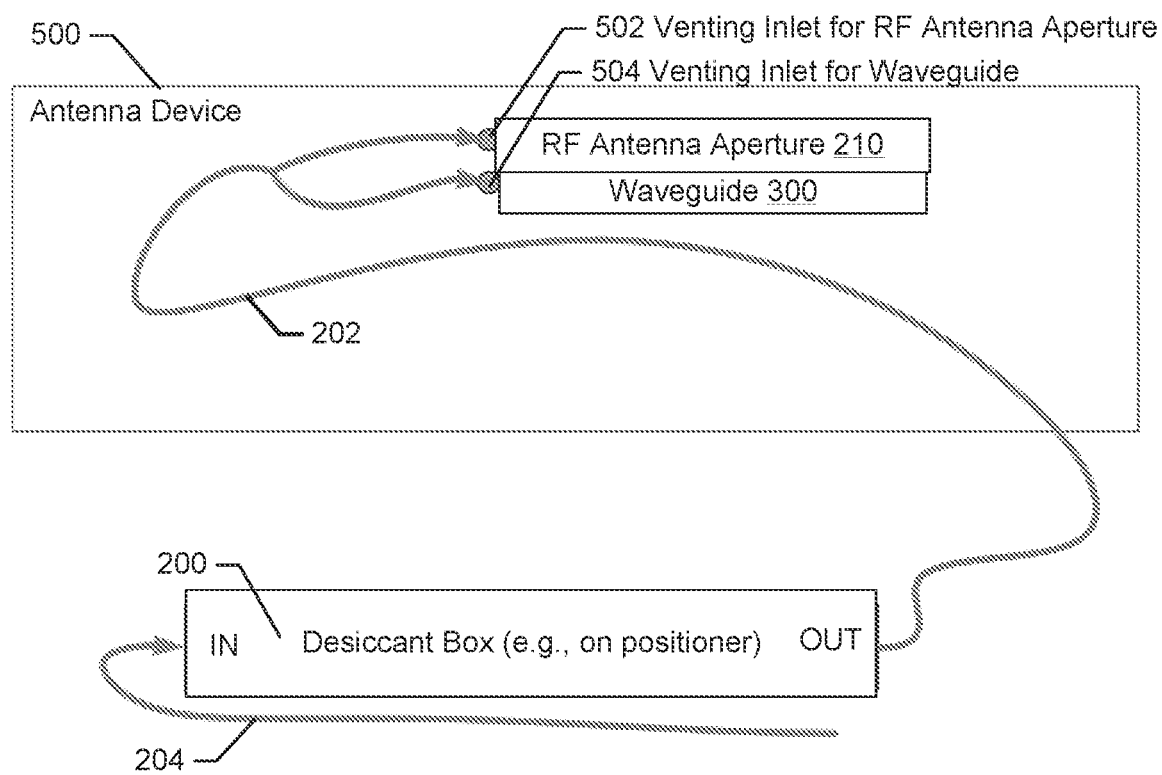
FIG. 5 is a block diagram of a desiccant box type of condensation control component that reduces moisture in air supplied through one or more air pipes to a RF antenna aperture and RF waveguide of the antenna device in accordance with some embodiments of the present disclosure.

FIG. 5 is a block diagram of a desiccant box type of condensation control component that reduces moisture in ambient air supplied through one or more air pipes to a RF antenna aperture and RF waveguide of the antenna device in accordance with some embodiments of the present disclosure.

Referring to FIG. 5, the desiccant box 200 has an input air pipe 204 connected to ambient air outside the antenna system 190 and an output air pipe 202 connected to a venting inlet 502 for the RF antenna aperture and connected to another venting inlet 504 for the waveguide of an antenna device 500 which may correspond to a portion of the antenna system 190 of FIGS. 2 and 3. Accordingly, the desiccant box 200 reduces moisture in the air that flows between ambient conditions outside the antenna system and the RF antenna aperture and the waveguide.

The length of the air pipe 204 may be, for example, 0.1 meters to 0.75 meters with an internal diameter of, for example, 0.5 mm to about 2 mm or more preferably about 1 mm, to reduce the amount of humidity traveling through the air pipe 204 that reaches the desiccant box 200, reduce the rate of air flow through the desiccant material in the desiccant box 200 to enhance water absorption, and/or reduce the rate of consumption of the desiccant material through absorption of water. The air pipe 202 would preferable have a larger internal diameter than the air pipe 204, such as about a 4 mm internal diameter for air pipe 202 and a 1 mm internal diameter for air pipe 204. However, other lengths and diameters of air pipes may be used.

Although a single air pipe 202 is shown in the non-limiting example of FIG. 5 as being output from the desiccant box 200 and being split to connect to one venting inlet of the RF antenna aperture and to one venting inlet of the waveguide, any number of output air pipes may be output by the desiccant box 200 and any number of splits of those air pipes may be provided for input to any number of inlets to the RF antenna aperture and the waveguide. For example, the air pipe 202 may be split four ways, with two of the split pipes being connected to two venting inlets of the RF antenna aperture and another two of the split pipes being connected to two venting inlets to the waveguide. Alternatively, one split may be input to the waveguide and three splits may be input to different air volumes of the RF antenna aperture. When multiple venting inlets are provided on one component, the venting inlets may be spaced apart to vent distant spaces of the interior air voids in that component.

Although the RF antenna aperture and the waveguide have been illustrated as having a single venting inlet connected to the air pipe 202 outlet of the desiccant box 200, in some other embodiments one or both of the RF antenna aperture and the waveguide have a plurality of venting inlets connected to receive dried air from the desiccant box. For example, in one embodiment the air pipe 202 is connected to provide dried air to three spaced apart locations on the RF antenna aperture to ensure moisture accumulation does not occur at key RF signal transmission or reception areas of the RF antenna aperture while pressure equalization is occurring.

In each of the embodiments shown in FIGS. 2 through 10, it is therefore to be understood that any number of air pipes can be output from a desiccant box and any number of splits can be made from the one or more pipes for connection to any number of venting inlets of the RF antenna aperture and/or the waveguide. Moreover, as will be described below, a condenser may be used in place of or in combination with a desiccant box. It is to be understood that any number of air pipes can be output from a condenser and any number of splits can be made from the one or more pipes for connection to any number of venting inlets of the RF antenna aperture and/or the waveguide or for connection as inputs to any number or desiccant boxes.

The desiccant box 200 may be configured with non-regenerating capabilities for the desiccant material that results in a net-accumulation of moisture over time and which may need to be replaced as a repetitive maintenance task. Alternatively, the desiccant box 200 may be configured to provide passive regeneration or active regeneration of the drying capability of the desiccant material. Active regeneration may be provided by thermally coupling the desiccant box 200 to a heater element as will be explained below with regard to FIG. 6.

Figure 6:
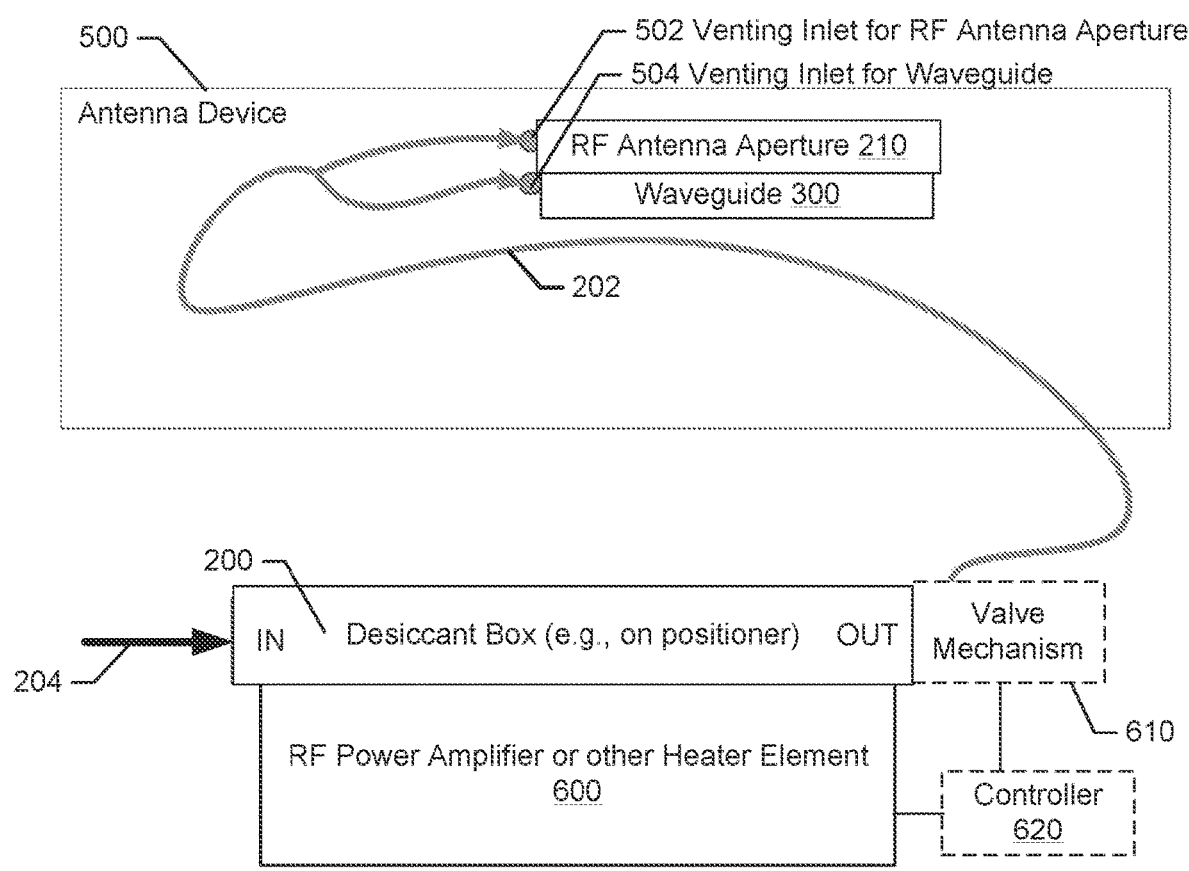
FIG. 6 is a block diagram of a desiccant box type of condensation control component that is connected to a heater element to provide active regeneration of the desiccant material in accordance with some embodiments of the present disclosure.

FIG. 6 is a block diagram of a desiccant box type of condensation control component that is thermally coupled to a heater element to provide active regeneration of the desiccant material in accordance with some embodiments of the present disclosure. Referring to FIG. 6, the desiccant box 200 has an input air pipe 204 connected to ambient air outside the antenna system 190, i.e., outside the antenna enclosure, and an output air pipe connected to a venting inlet 502 for the RF antenna aperture and connected to another venting inlet 504 for the waveguide of an antenna device 500 which may correspond to a portion of the antenna system 190 of FIGS. 2 and 3. Accordingly, the desiccant box 200 reduces moisture in the air that flows between ambient conditions outside the antenna system and the RF antenna aperture and the waveguide. In accordance with a further embodiment, the desiccant box 200 is thermally coupled, e.g., directly attached to, a RF power amplifier (e.g., 220 in FIGS. 2 and 3) and/or another heater element 600.

For example, circuitry of the RF power amplifier 220 generates heat while amplifying RF signaling provided to the RF antenna aperture 210. The heat can be used to warm the desiccant material in the desiccant box 200 to expel and reduce moisture content therein, and which moisture can be vented outside the antenna system 190 such as through the air pipe 204. Thus, for example, while the aircraft operates at a cruise altitude having low-temperature low-humidity ambient air, heat from the RF power amplifier can be thermally coupled to the desiccant box 200 to heat the desiccant material to cause expulsion of moisture and reduction in moisture content in the desiccant material, and the released moisture is vented outside the antenna system 190. The drying capabilities of the desiccant material are thereby regenerated to prolong life of the desiccant material to dry higher-humidity ambient air that is passed through the desiccant box 200 to equalize pressure in the RF antenna aperture 210 and RF waveguide 300 (FIGS. 3 and 8) while the aircraft descends for landing and remains on the ground in higher-temperature higher-humidity ambient air conditions.

In FIG. 6, a valve mechanism 610 may be included to reduce or prevent flow of moisture from the desiccant box 200 to the internal air volumes of the RF antenna aperture 210 and RF waveguide 300 (FIGS. 3 and 8) while the desiccant material is being dried. The valve mechanism 610 may include one or more pressure operated valves. For example, the valve mechanism 610 may include a pressure operated valve that only allows airflow between the desiccant box 200 and the internal air volumes of the RF antenna aperture 210 and RF waveguide 300 while the differential pressure exceeds a defined threshold amount. For example, the valve mechanism 610 may include a resilient member, e.g., spring, that urges a valve towards a closed position (blocking airflow into the RF antenna aperture 210 and the RF waveguide 300) and which is increasingly forced open to allow equalization airflow as the ambient air pressure outside the antenna enclosure increases relative to the air pressure within the antenna enclosure, and which may be similarly configured to inhibit equalization airflow in the opposite direction from within the antenna enclosure to outside the antenna enclosure or may be configured to not inhibit that equalization airflow in the opposite direction.

Alternatively or additionally, the valve mechanism 610 may include an electromechanical valve that is controlled by a controller 620 which temporarily precludes airflow from the desiccant box 200 toward the internal air volumes while the desiccant material is substantially venting moisture. The controller 620 may selectively control heating of the desiccant material within the desiccant box 200 by the RF power amplifier or other heater element 600, and may include a moisture sensor configured to sense moisture level in the desiccant material and/or ambient air and trigger regenerative heating thereof when the moisture level exceeds a defined threshold value. Alternatively or additionally, the controller 620 may temporarily close the valve mechanism 610 while the desiccant material is being dried through regenerative heating, such as while the aircraft is cruising in a low-temperature low-humidity ambient air conditions, and thereafter open the valve mechanism 610 to allow drying of the airflow into the RF antenna aperture 210 and the RF waveguide 300 during pressure equalization while the aircraft is descending altitude.

The valve mechanism 610 is configured to toggle between open and closed positions. In some embodiments, the valve mechanism 610 in the closed position blocks or substantially blocks air flow between the desiccant box and the RF antenna aperture 210 and the RF waveguide 300. In some other embodiments the valve mechanism 610 in the closed position only partially blocks to restrict air flow between the desiccant box and the RF antenna aperture 210 and the RF waveguide 300. A potential advantage of only partially restricting air flow in this manner is that if the valve mechanism 610 operation were to fail while in the closed position, an excessive pressure differential would be prevented from occurring between the antenna system enclosure and the outside ambient air.

In another embodiment, the controller 620 may control a heater element, which may be a device other than the power amplifier, to heat the desiccant material only while air is being vented from within the internal air volumes through the desiccant box 200 to outside, such as while the aircraft is climbing to cruise altitude and the higher pressure air within the internal air volumes is vented for pressure equalization, so that the moisture expelled by the desiccant material flows outside the antenna enclosure. The controller 620 may sense a direction of airflow through the desiccant box 200, such as by sensing pressure differential between inside and/or outside the antenna enclosure and/or by determining when the aircraft is gaining altitude based on identifying trends in sensor data (e.g., monitoring pressure readings from a pressure sensor over time to identify increasing pressure trends and decreasing pressure trends and/or monitoring trends in altitude and/or flight phase data being communicated through an aircraft flight data network), and selectively control the heater element (e.g., initiate flow of power to the heater element) to heat the desiccant material during a portion of the time interval when air is being vented from inside to outside the antenna enclosure, and oppositely control the heater element (e.g., cease or prevent flow of power to the heater element) while air is flowing from outside the antenna enclosure to interior air spaces of the RF antenna aperture 210 and/or the RF waveguide 300.

In one embodiment, the controller 620 is connected to receive signaling from a pressure sensor and triggers heating of the heating element based on determining that the air pressure (measured inside or outside the antenna enclosure) is decreasing over at least a threshold time duration, and thereby indicating that the airflow is being exhausted outside the antenna enclosure. The controller 620 can conversely cease heating or prevent heating of the heating element based on determining that the air pressure (measured inside or outside the antenna enclosure) is increasing over at least a threshold time duration, and thereby indicating that the airflow is in a direction from outside the antenna enclosure through the desiccant enclosure to interior spaces of the RF antenna aperture 210 and/or the RF waveguide 300.

In another embodiment, the controller 620 obtains aircraft altitude data and/or pressure data from an aircraft flight data network and triggers heating of the heating element based on determining that the aircraft is increasing altitude over at least a threshold time duration, and thereby indicating that the airflow is being exhausted outside the antenna enclosure. The controller 620 can conversely cease heating or prevent heating of the heating element based on determining that the decreasing altitude over at least a threshold time duration, and thereby indicating that the airflow is in a direction from outside the antenna enclosure through the desiccant enclosure to interior spaces of the RF antenna aperture 210 and/or the RF waveguide 300.

In one embodiment, the heating element includes a resistive strip heater or other resistive device heater, and the controller 620 can be configured to control the flow of power from a power source to the heater element. In this manner, the controller can trigger the heater element to warm the desiccant material to release moisture while air is being exhausted from the interior of the antenna enclosure. This operation serves to regenerate the ability of the desiccant material to absorb moisture and prolong the operational life of the desiccant material. The heating element may, for example include a ceramic heater, e.g., barium titanate, BaTiO3, and/or a metallic heater, e.g., nichrome, tungsten, molybdenum disilicide, etc.

The heating element may extend along interior surface(s) of the desiccant box 200 and/or may be positioned to be spaced apart from the interior surface(s) of the desiccant box. In one embodiment, parallel heater elements extend along a major length of the desiccant box 200 and are spaced apart along a width of the desiccant box 200 to heat the desiccant material more uniformly. In another embodiment, spaced apart heater elements are positioned spaced apart along a major length of the desiccant box 200 to heat the desiccant material. In another embodiment, the heater element extends in a spiral direction along an interior of the desiccant box 200 to provide more uniform heating of the desiccant material. When the desiccant box 200 has a cylindrical shape and includes a spiral structure extending along the cylinder to provide spiral airflow through the desiccant material along the cylinder, the spiral structure may include a resistive heater which is connectable to a power source to be heated to warm the desiccant material for regeneration purposes.

Figure 7:
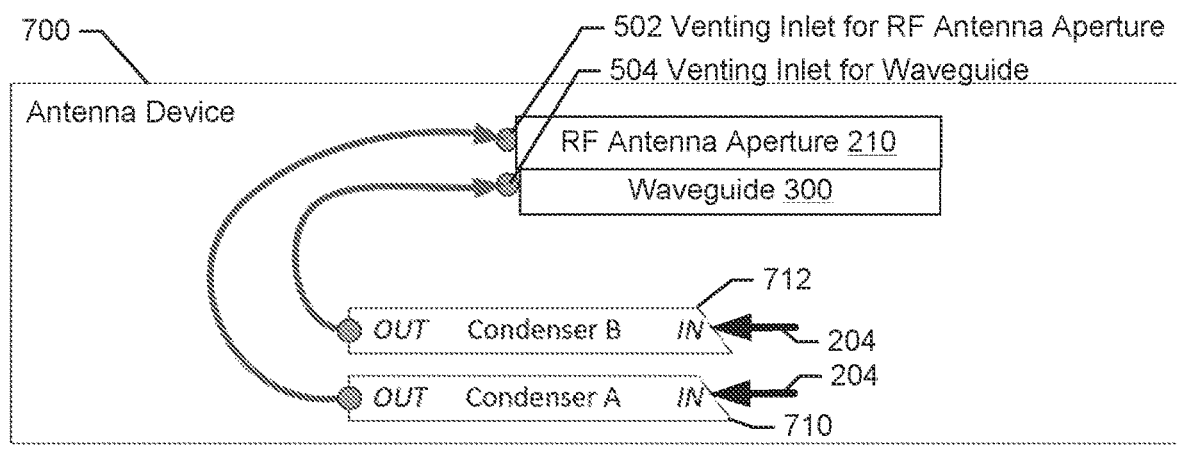
FIG. 7 is a block diagram of a condenser type of condensation control component that reduces moisture in air supplied through one or more air pipes to a RF antenna aperture and RF waveguide of the antenna device in accordance with some embodiments of the present disclosure.

FIG. 7 is a block diagram of a condenser type of condensation control component that reduces moisture in air supplied through one or more air pipes to a RF antenna aperture and RF waveguide of the antenna device in accordance with some embodiments of the present disclosure.

Referring to FIG. 7, an antenna device 700 includes a pair of condensers A and B 710 and 712 that interconnect to ambient air, which may be provided through an input air pipe 204, to receive ambient air outside the antenna device 700 for providing to venting inlet 502 for the RF antenna aperture and to another venting inlet 504 for the RF waveguide. Accordingly, the condensers A and B 710 and 712 are configured to reduce moisture in the air that flows between ambient conditions outside the antenna system enclosure and the internal air volumes of the RF antenna aperture and the RF waveguide. Although the example of FIG. 7 shows two condensers, it is to be understood that a single condenser (i.e., both venting inlets 502 and 504 are connected to a same condenser) or more than two condensers may be used. The air pipe output of a single condenser can be split to any number of air pipes for connection to any number of venting inlets of the RF antenna aperture and waveguide.

While FIG. 7 is illustrated with two condensers, various embodiments described here in can have any combination of one, two, three, four, or more condensers in the antenna system.

Figure 8:
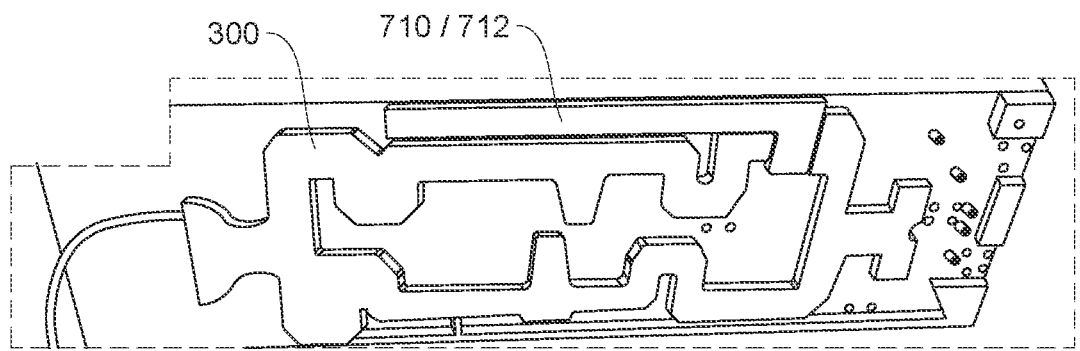
FIG. 8 is a picture of a condenser that is attached to a RF antenna aperture of an antenna device to reduce moisture in the air of the RF antenna aperture in accordance with some embodiments of the present disclosure.

FIG. 8 is a picture of a condenser that is attached to a RF antenna aperture of an antenna device to reduce moisture in the air of the RF antenna aperture in accordance with some embodiments of the present disclosure. Referring to FIG. 8, a condenser, indicated as 710/712 since it may correspond to one or both of the condenser shown in in FIG. 7, extends between an input air pipe (not shown) and a RF waveguide. The condenser 710/712 is thermally coupled to the RF waveguide and may be further thermally coupled to a supporting structure of the RF antenna aperture. While the aircraft is cruising at altitude the RF waveguide and supporting structure of the RF antenna aperture are cooled to low ambient temperatures. When the aircraft descends from cruising altitude to ground level the thermal mass of the RF waveguide and supporting structure of the RF antenna aperture causes them to remain cooler than ambient air for a period of time during which warmer ambient air flowing through the input of the condenser 710/712 is cooled, causing moisture to condense and drain out of the condenser input before reaching an output of the condenser 710/712. Thus, the air flowing through the condenser as the low pressure in the air cavities of the antenna device 700 equalizes to the higher pressure of the lower altitudes, the moisture in the air is reduced through condensation and expulsion from through the condenser 710/712 while traveling toward the air cavities of the antenna device 700.

Figure 13:
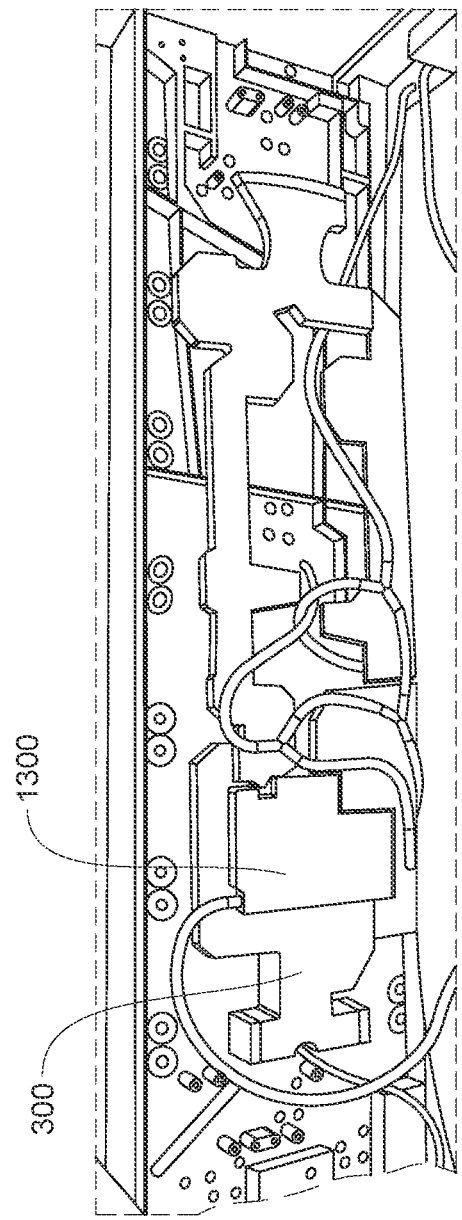
FIG. 13 illustrates an embodiment of the condenser where the condenser is a single metal box that is attached to a RF antenna aperture of an antenna device to reduce moisture in the air of the RF antenna aperture in accordance with some embodiments of the present disclosure.

FIG. 13 illustrates an embodiment of the condenser where the condenser is a single metal box 1000 that is attached to the RF antenna aperture 210 of the antenna system. The condenser 1000 is thermally coupled to the RF antenna aperture 210 which has a relatively high thermal mass and functions to cause changes to the temperature of the condenser 1000 to lag changes to the temperature of the airflow through the condenser 1000.

In an operational example, when the antenna system is descending from a higher altitude where the RF antenna aperture 210 and condenser 1000 are cooled, e.g. −50° C. temperature, to a lower altitude having a much higher temperature, e.g. +25° C. temperature and much more humid air, the condenser 1000 temperature change substantially lags the inflowing ambient air temperature change. Consequently, the warm humid outside ambient air flowing into the much cooler condenser 1000 causes air moisture to condense on surfaces of the condenser 1000, where the moisture can be collected and expelled to outside the antenna system enclosure.

In some embodiments, the condenser 1000 has a meandering airflow pathway extending between the airflow input (e.g., input air pipe 204) and airflow output. For example, the condenser 1000 can include fingers extending from sideways of the condenser 1000, such as in an alternating and repeating manner from a left sidewall and then a right sidewall or vice versa.

Figure 9:
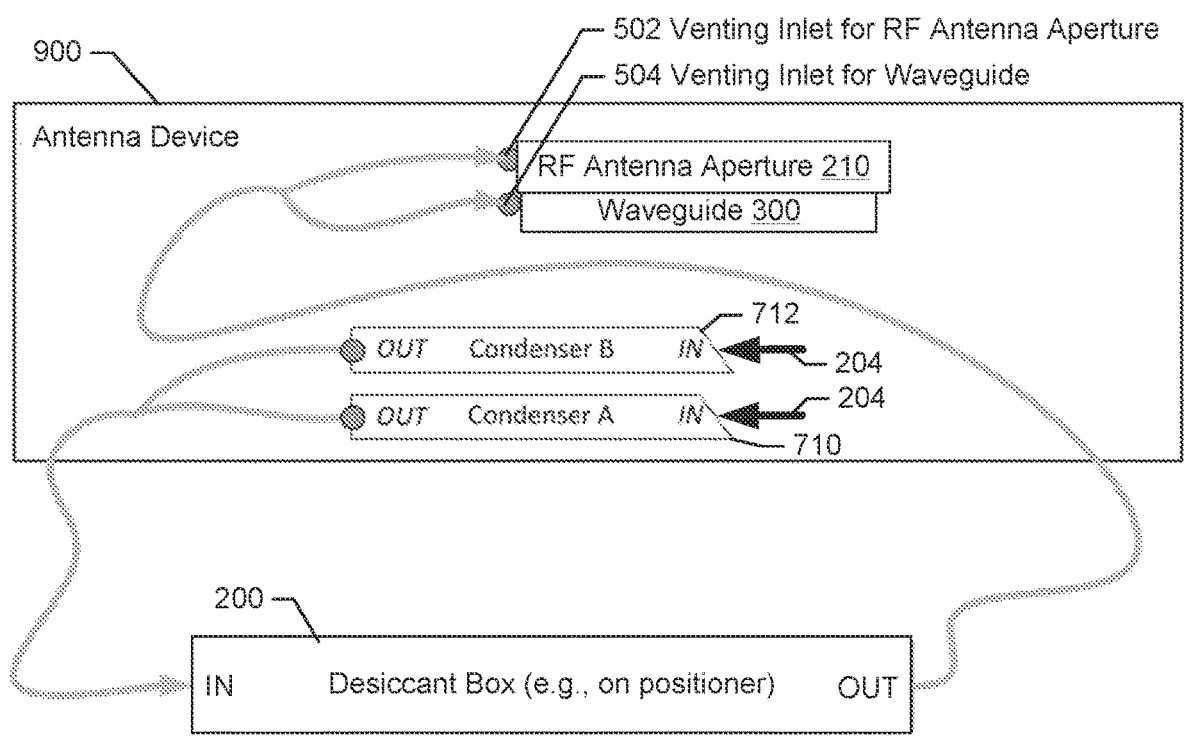
FIG. 9 is a block diagram of a condensation control component formed by a combination of a desiccant box and condenser that are connected in series to reduce moisture in air supplied through one or more air pipes to a RF antenna aperture and RF waveguide of the antenna device in accordance with some embodiments of the present disclosure.

FIG. 9 is a block diagram of a condensation control component formed by a combination of a desiccant box 200 and condenser 710/712 that are connected in series to further reduce moisture in air supplied through one or more air pipes to a RF antenna aperture and RF waveguide of the antenna device in accordance with some embodiments of the present disclosure.

Referring to FIG. 9, an antenna device 900 includes a pair of condensers A and B 710 and 712 that interconnects to ambient air, which can be through an input air pipe 204, to receive ambient air outside the antenna device 900 to an input of the desiccant box 200. Accordingly, the condensers A and B 710 and 712 are configured to reduce moisture in the air that flows between ambient conditions outside the antenna system and the internal air volumes of the RF antenna aperture and the RF waveguide. Further moisture reduction in the ambient airflow can be achieved by connecting the output flow of the condensers A and B 710 and 712 to an inlet of the desiccant box 200. Airflow output of the desiccant box 200 is then conducted through one or more air pipes to venting inlet 502 for the RF antenna aperture and to another venting inlet 504 for the RF waveguide.

Although the example of FIG. 9 shows two condensers, it is to be understood that a single condenser, or more than two condensers, may be used with a single desiccant box or with more desiccant boxes.

Figure 10:
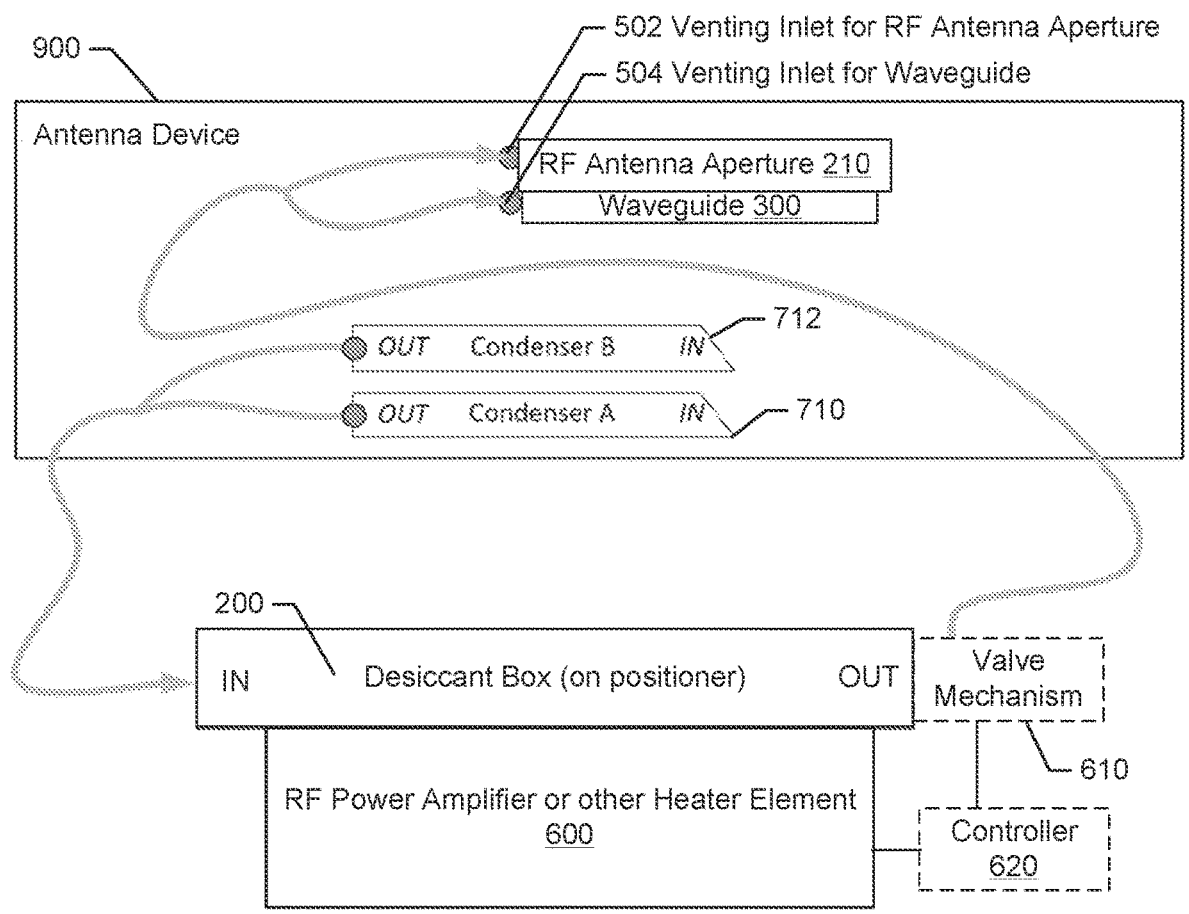
FIG. 10 is a block diagram of a condensation control component that is similar to FIG. 9 but in which the desiccant box is connected to a heater element to provide active regeneration of the desiccant material in accordance with some embodiments of the present disclosure.

FIG. 10 is a block diagram of a condensation control component that is similar to FIG. 9 but in which the desiccant box is connected to a heater element to provide active regeneration of the desiccant material in accordance with some embodiments of the present disclosure.

Referring to FIG. 10, the desiccant box 200 has an input air pipe connected through the condensers A and B 710 and 712 to ambient air outside the antenna device 900 and an output air pipe connected to the venting inlet 502 for the RF antenna aperture and to the venting inlet 504 for the waveguide of the antenna device 900. Accordingly, the desiccant box 200 further reduces moisture in the air that is output by the condensers A and B 710 and 712 toward the RF antenna aperture and the waveguide. In accordance with a further embodiment, the desiccant box 200 is thermally coupled, e.g., attached to, a RF power amplifier (e.g., 220 in FIGS. 2 and 3) and/or another heater element 600.

As explained above, the RF power amplifier 220 generates heat while amplifying RF signaling to the RF antenna aperture 210. The heat can be used to warm the desiccant material in the desiccant box 200 to reduce moisture content therein for active regeneration, and which moisture can be vented outside the antenna device 900. Thus, for example, while the aircraft operates at a cruise altitude having low-temperature low-humidity ambient air, heat from the RF power amplifier can be thermally coupled to the desiccant box 200 to heat the desiccant material to cause expulsion of moisture and reduction in moisture content in the desiccant material with the moisture being vented outside the antenna device 900. The drying capabilities of the desiccant material are thereby regenerated to prolong life of the desiccant material for drying higher-humidity ambient air that is passed through the desiccant box 200 to equalize pressure in the RF antenna aperture and RF waveguide while the aircraft descends for landing and remains on the ground in higher-temperature higher-humidity ambient air conditions.

A valve mechanism 610 may be included to reduce or prevent flow of moisture from the desiccant box 200 to the internal air volumes of the RF antenna aperture and RF waveguide while the desiccant material is being dried. The valve mechanism 610 may include one or more pressure operated valves. For example, the valve mechanism 610 may include a pressure operated valve that only allows airflow between the desiccant box 200 and the internal air volumes of the RF antenna aperture 210 and RF waveguide 300 while the differential pressure exceeds a defined threshold amount. Alternatively or additionally, the valve mechanism 610 may include an electromechanical valve that is controlled by a controller 620 which temporarily precludes airflow from the desiccant box 200 toward the internal air volumes while the desiccant material is substantially venting moisture. The controller 620 may selectively control heating of the desiccant box 200 by the RF power amplifier or other heater element 600, and may include a moisture sensor configured to sense moisture level in the desiccant material and/or ambient air and trigger regenerative heating thereof when the moisture level exceeds a defined threshold value. Alternatively or additionally, the controller 620 may temporarily close the valve mechanism 610 while the desiccant material is being dried, such as while the aircraft is cruising in a low-temperature low-humidity ambient air conditions, and thereafter open the valve mechanism 610 to allow drying of the air during pressure equalization while the aircraft is descending altitude.

In one embodiment, the controller 620 controls the valve mechanism 610 to the closed position based on obtaining internal navigation reference (e.g., geographic location) indication that the aircraft is presently located on the ground in an environment having at least a threshold humidity level.

In another embodiment, the controller 620 may control a heater element, which may be different than the power amplifier, to heat the desiccant material only while air is being vented from within the internal air volumes through the desiccant box 200 to outside, such as while the aircraft is climbing to cruise altitude and the higher pressure air within the internal air volumes is vented for pressure equalization, so that the moisture from the desiccant material flows outside the antenna. The controller 620 may sense a direction of airflow through the desiccant box 200, such as by sensing pressure differential between inside and outside the antenna and/or by determining when the aircraft is gaining altitude based on sensor data, and selectively heat the desiccant material during a portion of the time interval when air is being vented outside the antenna.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware without software or may be a combination of hardware and software executed by a computer controller.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An antenna system for an airplane, the antenna system comprising:
    an antenna system enclosure;
    a desiccant enclosure within the antenna system enclosure and having desiccant material positioned between an outside air pipe and an inside air pipe, the inside air pipe extending from the desiccant enclosure to open to an interior air volume of at least one component of the antenna system within the antenna system enclosure, the outside air pipe extending from the desiccant enclosure to ambient air outside the antenna system enclosure, and the desiccant material is configured to absorb moisture in the ambient air flowing from the outside air pipe to the inside air pipe through the desiccant enclosure while air pressure is being equalized from outside to inside the antenna system enclosure.

2. An antenna system for an airplane, the antenna system comprising:
    an antenna system enclosure;
    a desiccant enclosure within the antenna system enclosure and having desiccant material positioned between an outside air pipe and an inside air pipe, the inside air pipe extending from the desiccant enclosure to open to an interior air volume of at least one component of the antenna system within the antenna system enclosure, the outside air pipe extending from the desiccant enclosure to ambient air outside the antenna system enclosure, and the desiccant material is configured to absorb moisture in the ambient air flowing from the outside air pipe to the inside air pipe through the desiccant enclosure while air pressure is being equalized from outside to inside the antenna system enclosure,
    wherein the inside air pipe extends to open to an internal air volume of a RF antenna aperture of the antenna system and/or an internal air volume of a RF waveguide of the antenna system within the antenna system enclosure.

3. The antenna system of claim 2, wherein the desiccant enclosure comprises a rectangular box.

4. The antenna system of claim 2, wherein the desiccant enclosure comprises a cylindrical tube.

5. The antenna system of claim 2, wherein the inside air pipe has an internal diameter greater than an internal diameter of the outside air pipe to reduce a rate of consumption of the desiccant material in the desiccant enclosure.

6. The antenna system of claim 2, wherein the inside air pipe splits to extend to openings of an internal air volume of a RF antenna aperture within the antenna system enclosure and an internal air volume of a RF waveguide within the antenna system enclosure.

7. The antenna system of claim 2, wherein the inside air pipe splits four ways with three of the splits of the inside air pipe extending to three spaced apart openings of an internal air volume of a RF antenna aperture within the antenna system enclosure and one of the splits of the inside air pipe extending to an opening of an internal air volume of a RF waveguide within the antenna system enclosure.

8. The antenna system of claim 2, further comprising:
    a spiral structure provided in the desiccant enclosure extending a major axis of the desiccant enclosure along the air flow pathway between the inside air pipe and the outside air pipe, the spiral structure directing the airflow in a spiraling pathway through the desiccant material.

9. The antenna system of claim 8, wherein:
    the desiccant enclosure comprises a cylindrical tube;
    the spiral structure has a diameter about equal to an interior diameter of the cylindrical tube and extends between by endcaps of the cylindrical tube.

10. The antenna system of claim 2, further comprising:
    a plurality of airflow guides spaced apart along the desiccant enclosure and each extending downward from a top surface of the desiccant enclosure to force the airflow to be diverted downward away from the top surface of the enclosure through the desiccant material toward the bottom surface of the enclosure.

11. The antenna system of claim 10, wherein:
    the plurality of airflow guides each extend between side surfaces of the desiccant enclosure and extend downward from the top surface of the desiccant enclosure at least 50% of a distance between top and bottom surfaces of the desiccant enclosure.

12. The antenna system of claim 2, further comprising:
a heater element thermally coupled to the desiccant enclosure and configured to heat the desiccant material to cause expulsion of moisture and reduction in moisture content in the desiccant material for venting of the moisture through the outside air pipe to outside the antenna system enclosure.

13. The antenna system of claim 12, further comprising:
a controller configured to initiate heating by the heater element during a time duration while signaling from a pressure sensor indicates a pressure differential exists between the air within the antenna system enclosure and ambient air outside the antenna system enclosure that is causing air to be exhausted from the inside of the antenna enclosure through the desiccant material to the outside of the antenna enclosure.

14. The antenna system of claim 13, wherein:
the controller configured to cease heating by the heater element based on signaling from the pressure sensor indicating a pressure differential exists between the air within the antenna system enclosure and ambient air outside the antenna system enclosure that is causing air to be input from the outside of the antenna enclosure through the desiccant material to the inside of the antenna enclosure.

15. The antenna system of claim 12, wherein:
the controller configured to monitor pressure readings from a pressure sensor over time to identify increasing pressure trends and decreasing pressure trends and/or monitor trends in altitude and/or flight phase data being communicated through an aircraft flight data network, and to initiate heating by the heater element based on the trends indicating that the aircraft is gaining altitude.

16. The antenna system of claim 12, further comprising:
a controller configured to initiate heating by the heater element during a time duration while signaling from an airflow direction sensor indicates that air is being exhausted from the inside of the antenna enclosure through the desiccant material to the outside of the antenna enclosure.

17. The antenna system of claim 12, wherein the heating element extends along at least one interior surface of the desiccant enclosure.

18. The antenna system of claim 17, wherein the heating element extending along at least one interior surface of the desiccant enclosure is positioned to be space apart from the at least one interior surface of the desiccant enclosure.

19. The antenna system of claim 12, wherein the heater element extends spiraling in a direction along the air flow pathway between the inside air pipe and the outside air pipe.

20. The antenna system of claim 12, wherein the heating element is an RF power amplifier, and the desiccant enclosure is mounted against and thermally coupled to the RF power amplifier.

21. The antenna system of claim 12, further comprising:
a valve mechanism connected to the inside air pipe and movable between an open position and a closed position; and
a controller configured to control the value mechanism to move between the open position and the closed position, the controller controlling the value mechanism to move to the closed position for a part of a duration that the heater element is heating the desiccant material to cause expulsion of moisture and reduction in moisture content in the desiccant material, and controlling the value mechanism to move to the open position based on the heater element ceasing to heat the desiccant material.

22. The antenna system of claim 21, wherein the controller controls the valve mechanism to the closed position based on obtaining internal navigation reference indication that the aircraft is presently located on the ground in an environment having at least a threshold humidity level.

23. The antenna system of claim 2, further comprising:
a condenser connected to the outside air pipe to intervene in the ambient air flowing from outside the antenna system enclosure to the desiccant enclosure, the condenser having a meandering airflow pathway through which the ambient air flows toward the desiccant enclosure, the condenser is attached and thermally coupled to the RF waveguide having a thermal mass that functions to cause changes to the temperature of the condenser to lag changes to the temperature of the air flowing through the condenser.

* * * * *